US011310766B2

(12) United States Patent
Gao et al.

(10) Patent No.: US 11,310,766 B2
(45) Date of Patent: Apr. 19, 2022

(54) SIGNAL TRANSMISSION METHOD AND APPARATUS

(71) Applicant: HUAWEI TECHNOLOGIES CO., LTD., Guangdong (CN)

(72) Inventors: Kuandong Gao, Chengdu (CN); Huang Huang, Chengdu (CN); Mao Yan, Chengdu (CN); Hua Shao, Shenzhen (CN)

(73) Assignee: Huawei Technologies Co., Ltd., Guangdong (CN)

( * ) Notice: Subject to any disclaimer, the term of this patent is extended or adjusted under 35 U.S.C. 154(b) by 0 days.

(21) Appl. No.: 16/988,300

(22) Filed: Aug. 7, 2020

(65) Prior Publication Data

US 2020/0374835 A1 Nov. 26, 2020

Related U.S. Application Data

(63) Continuation of application No. PCT/CN2019/072867, filed on Jan. 23, 2019.

(30) Foreign Application Priority Data

Feb. 9, 2018 (CN) .......................... 201810136426.8

(51) Int. Cl.
  *H04W 68/02* (2009.01)
  *H04W 68/00* (2009.01)
  *H04W 74/00* (2009.01)
  *H04W 74/08* (2009.01)
(52) U.S. Cl.
  CPC ......... *H04W 68/02* (2013.01); *H04W 68/005* (2013.01); *H04W 74/006* (2013.01); *H04W 74/0833* (2013.01)

(58) Field of Classification Search
  CPC . H04W 68/02; H04W 68/005; H04W 74/006; H04W 74/0833
  USPC ................ 370/329, 328, 338, 341, 345, 350
  See application file for complete search history.

(56) References Cited

U.S. PATENT DOCUMENTS

2017/0367069 A1 12/2017 Agiwal et al.
2020/0404615 A1* 12/2020 Chen ................. H04W 74/0833

FOREIGN PATENT DOCUMENTS

CN        107431890 A    12/2017
WO        2009136253 A1  11/2009

OTHER PUBLICATIONS

InterDigital Inc., "Paging Indicator Design," 3GPP TSG-RAN WG2 Meeting #100, R2-1801122, Vancouver, Canada, Jan. 22-26, 2018, 4 pages.

(Continued)

*Primary Examiner* — Nghi H Ly
(74) *Attorney, Agent, or Firm* — Fish & Richardson P.C.

(57) ABSTRACT

This disclosure describes signal transmission methods and apparatus. On example method includes: receiving, by a terminal device, a paging indication sent by a network device, where the paging indication carries information about a plurality of paging groups; and sending, by the terminal device to the network device based on an association relationship between a paged paging group in the plurality of paging groups and a random access preamble, a random access preamble associated with a paging group in which the terminal device is located.

9 Claims, 4 Drawing Sheets

(56) References Cited

OTHER PUBLICATIONS

Nokia et al,., "Definition of Paging Indicator for Response-Driven Paging," 3GPP TSG-RAN WG2 NR Ad hoc 1801, R2-1800774, Vancouver, Canada, Jan. 22-26, 2018, 4 pages.
PCT International Search Report and Written Opinion issued in International Application No. PCT/CN2019/072867 dated Apr. 22, 2019, 13 pages (with English translation).
Extended European Search Report issued in European Application No. 19750814.6 dated Feb. 16, 2021, 14 pages.
Huawei et al., "Finalization of NR paging," 3GPP TSG RAN WG1 Meeting #91, R1-1719373, Nov. 27-Dec. 1, 2017, 7 pages.
InterDigital Inc., "Paging Indicator Design," 3GPP RSG-RAN WG2 Meeting #100, R2-1712804, Reno, USA, Nov. 27-Dec. 1, 2017, 4 pages.
Nokia et al., "NR Physical Random Access Channel Capacity," 3GPP TSG RAN WG1 NR Ad-Hoc #2, R1-1710890, Qingdao, China, Jun. 27-30, 2017, 16 pages.
Potevio, "Consideration on response-driven paging," 3GPP TSG-RAN WG2 NR Ad hoc 1801, R2-1800769, Vancouver, Canada, Jan. 22-26, 2018, 4 pages.

\* cited by examiner

SIGNAL TRANSMISSION METHOD AND APPARATUS

CROSS-REFERENCE TO RELATED APPLICATIONS

This application is a continuation of International Application No. PCT/CN2019/072867, filed on Jan. 23, 2019, which claims priority to Chinese Patent Application No. 201810136426.8, filed on Feb. 9, 2018. The disclosures of the aforementioned applications are hereby incorporated by reference in their entireties.

TECHNICAL FIELD

This application relates to the communications field, and more specifically, to a signal transmission method and apparatus.

BACKGROUND

In future 5th generation (5G) communication of a system, a carrier frequency higher than that of long term evolution (LTE), for example, a carrier frequency higher than 6 GHz such as 38 GHz or 72 GHz, is used to implement wireless communication with a larger bandwidth and a higher transmission rate. Because the carrier frequency is higher, a radio signal undergoes more severe fading in a spatial propagation process, and even a receive end may find it difficult to detect the radio signal. For this reason, a beamforming technology is used in a 5G communications system to obtain a beam with good directivity. The beamforming technology is used to limit, to a beam direction, a capability of transmitting a signal, thereby improving signal sending and receiving efficiency.

Because beam coverage in which the beamforming technology is used is relatively narrow, and a network device does not know a specific location of a terminal device, the network device may send broadcast information (for example, a paging message) to perform beam sweeping, to cover an unknown location of the terminal device. To reduce beam sweeping overheads in a paging message transmission process, when a paging message arrives, the network device may send a paging indication message in advance. After receiving the paging indication message broadcast by the network device, the terminal device feeds back a random access preamble to report a beam with relatively good signal quality, and then, the network device delivers the paging message based on the beam reported by the terminal device. In this way, the network device can avoid sending, in a relatively poor receiving direction of the terminal device, the paging message to the terminal device, thereby reducing the beam sweeping overheads.

The terminal device may teed back the random access preamble after receiving the paging indication message. Because the random access preamble is associated with a relatively large amount of information, overheads are relatively high.

SUMMARY

This application provides a signal transmission method and apparatus, to reduce overheads of random access preambles.

According to one aspect, a signal transmission method is disclosed, including:

sending, by a network device, a paging indication to a terminal device, where the paging indication carries information about a plurality of paging groups; and sending, by the terminal device to the network device based on an association relationship between a paged paging group in the plurality of paging groups and a random access preamble, a random access preamble associated with a paging group in which the terminal device is located. Further, the network device may send a paging message to the terminal device based on the received random access preamble associated with the paging group in which the terminal device is located.

There may be one or more paged paging groups in the plurality of paging groups. In this application, "a plurality of" means two or more. In the foregoing solution, the network device may determine, based on the association relationship, the random access preamble associated with the paging group in which the terminal device is located, and send the random access preamble. Only the paged paging group is associated with the random access preamble, thereby reducing preamble overheads.

With reference to the foregoing solution, if a quantity of random access preambles associated with paged paging groups is greater than or equal to a quantity of the paged paging groups, each paged paging group is associated with one random access preamble, in other words, the paged paging group is associated with the random access preamble in a one-to-one manner; or if a quantity of random access preambles associated with paged paging groups is less than a quantity of the paged paging groups, at least two paged paging groups share one random access preamble, for example, the paged paging group is associated with the random access preamble in a cyclic reuse manner, every at least two paged paging groups share one random access preamble, or another manner may be used.

For example, if there are three random access preambles, and there are also three paged paging groups, each paged paging group is associated with one random access preamble, a preamble 1 may be associated with a group 1, a preamble 2 is associated with a group 2, and a preamble 3 is associated with a group 3. Certainly, the association may not be performed in sequence.

If there are three random access preambles, and there are five paged paging groups, a preamble 1 may be associated with groups 1 and 4, a preamble 2 is associated with groups 2 and 5, and a preamble 3 is associated with a group 3. In other words, preamble indexes associated with the five paged paging groups are sequentially 12312, or may be 11223, or may be 32132, 12332, 11332, 12311, or the like. In conclusion, at least two paged paging groups need to be associated with one random access preamble.

With reference to the foregoing solutions, the quantity of random access preambles associated with the paged paging groups is related to at least one of the following parameters: a quantity of random access preambles used for paging, a quantity of synchronization signals/physical broadcast channel blocks SS/PBCH blocks associated with one random access occasion; and a quantity of paging occasions associated with one random access occasion.

In the foregoing solutions, only the paged paging group is associated with the random access preamble, and a paging group that is not paged does not need to be associated with a random access preamble, thereby reducing overheads of random access preambles.

According to another aspect, a signal transmission method is disclosed, including:

sending, by a network device, a paging indication to a terminal device, where the paging indication carries information about a plurality of paging groups; and sending, by the terminal device to the network device based on an association relationship between the plurality of paging groups and a random access preamble, a random access preamble associated with a paging group in which the terminal device is located. Further, the network device may send a paging message to the terminal device based on the random access preamble associated with the paging group in which the terminal device is located.

With reference to the foregoing solution, if a quantity of random access preambles associated with paging groups is greater than or equal to a quantity of the plurality of paging groups, each paging group is associated with one random access preamble, in other words, the paged paging group is associated with the random access preamble in a one-to-one manner; or if a quantity of random access preambles associated with paging groups is less than a quantity of the plurality of paging groups, at least two paging groups share one random access preamble, for example, the plurality of paging group is associated with the random access preamble in a cyclic reuse manner, every at least two paging groups share one random access preamble, or another manner may be used.

For example, if there are three random access preambles, and there are also three paging groups, each paging group is associated with one random access preamble, a preamble 1 may be associated with a group 1, a preamble 2 is associated with a group 2, and a preamble 3 is associated with a group 3. Certainly, the association may not be performed in sequence.

If there are three random access preambles, and there are five paging groups, a preamble 1 may be associated with groups 1 and 4, a preamble 2 is associated with groups 2 and 5, and a preamble 3 is associated with a group 3. In other words, preamble indexes associated with the five paging groups are sequentially 12312, or may be 11223, or may be 32132, 12332, 11332, 12311, or the like. In conclusion, at least two paging groups need to be associated with one random access preamble.

With reference to the foregoing solutions, the quantity of random access preambles associated with the paging groups is related to at least one of the following parameters: a quantity of random access preambles used for paging, a quantity of synchronization signals/physical broadcast channel blocks SS/PBCH blocks associated with one random access occasion; and a quantity of paging occasions associated with one random access occasion.

In the foregoing solutions, the network device may determine, based on the association relationship, the random access preamble associated with the paging group in which the terminal device is located, and send the random access preamble. The at least two paging groups share one random access preamble, thereby reducing overheads of random access preambles.

According to still another aspect, a signal transmission method is disclosed, including:

sending, by a network device, a paging indication to a terminal device, where the paging indication carries information about a plurality of paging groups; and sending, by the terminal device to the network device based on an association relationship between the plurality of paging groups and a random access preamble, a random access preamble associated with a paging group in which the terminal device is located, where at least two paging groups are associated with one random access preamble.

This solution is similar to the foregoing solution. For other features, refer to the foregoing solution.

According to yet another aspect, a signal transmission method is disclosed. A terminal device receives a paging indication sent by a network device, where the paging indication carries information about a plurality of paging groups; determines, based on an association relationship, a random access preamble associated with a paging group in which the terminal device is located; and sends the random access preamble to the network device. The association relationship is an association relationship between a paged paging group in the plurality of paging groups and a random access preamble, or an association relationship between the plurality of paging groups and a random access preamble.

The foregoing solution is described from a perspective of the terminal device. For other features, refer to the descriptions of the foregoing solutions.

According to still yet another aspect, a signal transmission method is disclosed, including: sending, by a network device, a paging indication to a terminal device, where the paging indication carries information about a plurality of paging groups; and receiving a random access preamble associated with a paging group in which the terminal device is located, where the random access preamble associated with the paging group in which the terminal device is located is determined based on an association relationship between a paged paging group in the plurality of paging groups and a random access preamble, or the random access preamble associated with the paging group in which the terminal device is located is determined based on an association relationship between the plurality of paging groups and a random access preamble.

Further, the method further includes: sending a paging message to the terminal device based on the random access preamble associated with the paging group in which the terminal device is located.

The foregoing two solutions are described from perspectives of the terminal device and the network device. For other features, refer to the descriptions of the foregoing aspects.

With reference to the foregoing solutions, each bit of the paging indication represents one paging group, where 1 represents a paged paging group, and 0 represents a paging group that is not paged; or 0 indicates a paged paging group, and 1 indicates a paging group that is not paged. There may be one or more random access preambles.

The association relationship in the foregoing solutions may be configured by the network device and delivered to the terminal device. Configuration information may be carried on any one of a physical broadcast channel (PBCH), remaining minimum system information (RMSI), a system information block (SIB) 1, a SIB 2, and a SIB 3, a media access control-control element (MAC-CE), downlink control information (DCI), radio resource control (RRC), and system information. In addition, the association relationship may be alternatively specified in a standard, or agreed on by the network device and the terminal device in advance.

In addition, an apparatus corresponding to each of the foregoing methods is disclosed. The apparatus may be the terminal device or the network device in each of the foregoing methods, or may be a chip or a function module in a terminal device or a network device. The apparatus has a corresponding function of implementing each of the foregoing methods. The function may be implemented by using hardware, or may be implemented by using hardware executing corresponding software. The hardware or software includes one or more units or modules corresponding to the foregoing function.

According to one aspect, a signal transmission apparatus is disclosed. The apparatus is a terminal device, or a chip or a function module in a terminal device, and includes:
- a receiving module, configured to receive a paging indication sent by a network device, where the paging indication carries information about a plurality of paging groups; and
- a sending module, configured to send, to the network device based on an association relationship between a paged paging group in the plurality of paging groups and a random access preamble, a random access preamble associated with a paging group in which the terminal device is located.

The apparatus may further include a processing module, configured to determine, based on the association relationship between the paged paging group in the plurality of paging groups and the random access preamble, the random access preamble associated with the paging group in which the terminal device is located.

According to another aspect, a signal transmission apparatus is disclosed. The apparatus is a terminal device, or a chip or a function module in a terminal device, and includes:
- a receiving module, configured to receive a paging indication sent by a network device, where the paging indication carries information about a plurality of paging groups; and
- a sending module, used by the terminal device to send, to the network device based on an association relationship between the plurality of paging groups and a random access preamble, a random access preamble associated with a paging group in which the terminal device is located.

The apparatus may further include a processing module, configured to determine, based on the association relationship between the plurality of paging groups and the random access preamble, the random access preamble associated with the paging group in which the terminal device is located.

According to still another aspect, a signal transmission apparatus is disclosed. The apparatus is a network device, or a chip or a function module in a network device, and includes:
- a sending module, configured to send a paging indication to a terminal device, where the paging indication carries information about a plurality of paging groups; and
- a receiving module, configured to receive a random access preamble associated with a paging group in which the terminal device is located, where the random access preamble associated with the paging group in which the terminal device is located is determined based on an association relationship between a paged paging group in the plurality of paging groups and a random access preamble, or the random access preamble associated with the paging group in which the terminal device is located is determined based on an association relationship between the plurality of paging groups and a random access preamble, where
- the sending module is further configured to send a paging message to the terminal device based on the random access preamble associated with the paging group in which the terminal device is located.

The foregoing apparatus is obtained through division of function modules of the network device or the terminal device, and a corresponding module performs a corresponding step in the method. For details, refer to the methods in the foregoing aspects. Details are not described again. The foregoing modules may be implemented in a form of hardware, or may be implemented in a form of a software function module. It should be noted that, in embodiments of this application, module division is an example, and is merely logical function division. In actual implementation, another division manner may be used.

In another possible design, the foregoing units may include a processing unit and a transceiver unit. The transceiver unit may include a transmitting unit and a receiving unit, which respectively perform corresponding steps of sending and receiving in the foregoing methods. The processing unit performs other steps except the steps of sending and receiving in the foregoing methods. The transceiver unit may be, for example, a transceiver, configured to perform the steps of sending and receiving in the foregoing methods. The transceiver includes a radio frequency circuit, or may include a transmitter and a receiver, which are respectively configured to perform steps of a sending type and steps of a receiving type in the methods. The processing unit may be a processor, configured to perform steps except the steps of sending and receiving in the foregoing methods. There may be at least one processing unit or processor.

Optionally, the terminal device further includes a storage unit, and the storage unit may be a memory. When the terminal device includes the storage unit, the storage unit is configured to store a computer-executable instruction. The processing unit is connected to the storage unit. The processing unit executes the computer-executable instruction stored in the storage unit, so that the terminal device performs the signal detection method in any solution of the first aspect.

The units mentioned above are also referred to as modules.

In another possible design, when the apparatus is a chip, the chip may include a processing unit and a transceiver unit. The processing unit may be, for example, a processor, and there may be at least one processor. The transceiver unit may be, for example, an input/output interface, a pin, or a circuit on the chip. The processing unit may execute a computer-executable instruction stored in a storage unit, so that the chip in the terminal performs the signal detection method in any solution of the first aspect. Optionally, the storage unit may be a storage unit in the chip, such as a register or a buffer, or the storage unit may be a storage unit in the terminal device but outside the chip, such as a read-only memory (ROM), another type of static storage device capable of storing static information and instructions, or a random access memory (RAM).

The processor mentioned in any one of the foregoing designs may be a general-purpose central processing unit (CPU), a microprocessor, an application-specific integrated circuit (ASIC), or one or more integrated circuits for controlling program execution of the signal detection method according to the first aspect.

According to yet another aspect, a communications system is provided. The communications system includes the terminal device and the network device that are mentioned in the foregoing solutions, and the terminal device and the network device jointly complete the foregoing methods.

According to still yet another aspect, a computer storage medium is provided. The computer storage medium stores program code, and the program code is used to indicate instructions for performing the methods.

According to a further aspect, a computer program product including an instruction is provided. When the computer program product is run on a computer, the computer is enabled to perform the foregoing methods.

DESCRIPTION OF EMBODIMENTS

The following describes the technical solutions of this application with reference to the accompanying drawings.

A terminal device in embodiments of this application may be a user device, an access terminal, a subscriber unit, a subscriber station, a mobile station, a mobile console, a remote station, a remote terminal, a mobile device, a user terminal, a terminal, a wireless communications device, a user agent, or a user apparatus. The terminal device may further be a cellular phone, a cordless phone, a session initiation protocol (SIP) phone, a wireless local loop (WLL) station, personal digital processing (Personal Digital Assistant, PDA), a handheld device having a wireless communication function, a computer device, another processing device connected to a wireless modem, a vehicle-mounted device, a wearable device, a terminal device in a future 5G network, a terminal device in a future evolved public land mobile network (PLMN), or the like. This is not limited in the embodiments of this application.

A network device in the embodiments of this application may be a device configured to communicate with the terminal device. The network device may be a base transceiver station (BTS) in a global system for mobile communications (GSM) or in code division multiple access (CDMA), or may be a NodeB (NB) in a wideband code division multiple access (WCDMA) system, or may be an evolved NodeB (Evolutional NodeB, eNB or eNodeB) in an LTE system, or may be a radio controller in a cloud radio access network (CRAN) scenario. Alternatively, the network device may be a relay node, an access point, a vehicle-mounted device, a wearable device, a network device in the future 5G network, a network device in the future evolved PLMN network, or the like. This is not limited in the embodiments of this application.

Figure 1:
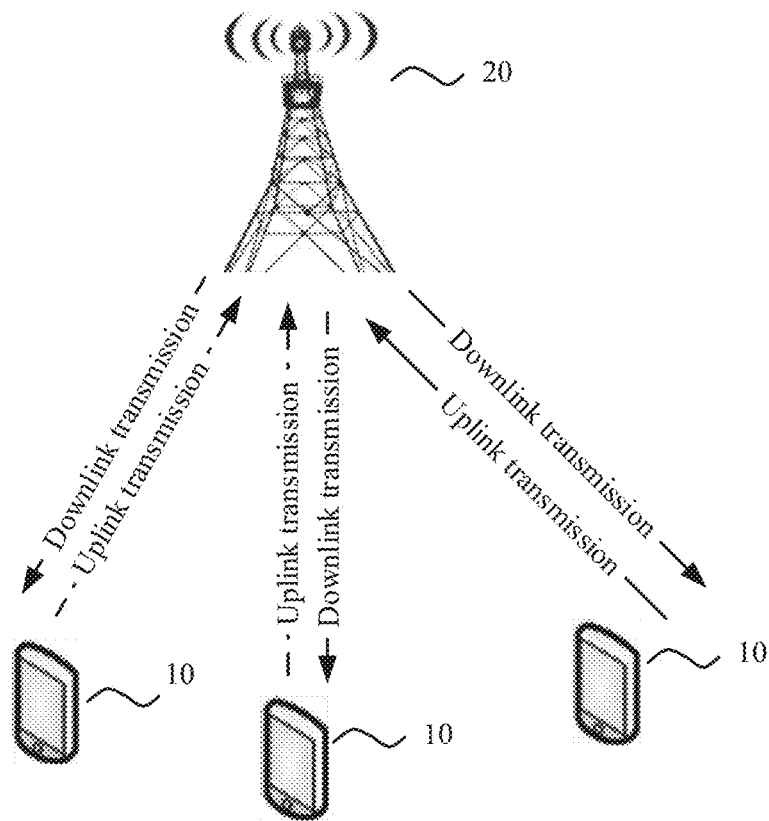
FIG. 1 is a schematic diagram of an application scenario according to an embodiment of this application.

FIG. 1 is a schematic diagram of a communications system according to this application. The communications system in FIG. 1 may include user equipment (UE) 10 and a network device 20. The network device 20 is configured to: provide a communications service for the user equipment 10 and access a core network. The user equipment 10 accesses a network by searching for a synchronization signal, a broadcast signal, or the like sent by the network device 20, to communicate with the network. Arrows shown in FIG. 1 may represent uplink/downlink transmission performed by using a cellular link between the user equipment 10 and the network device 20.

Figure 2:
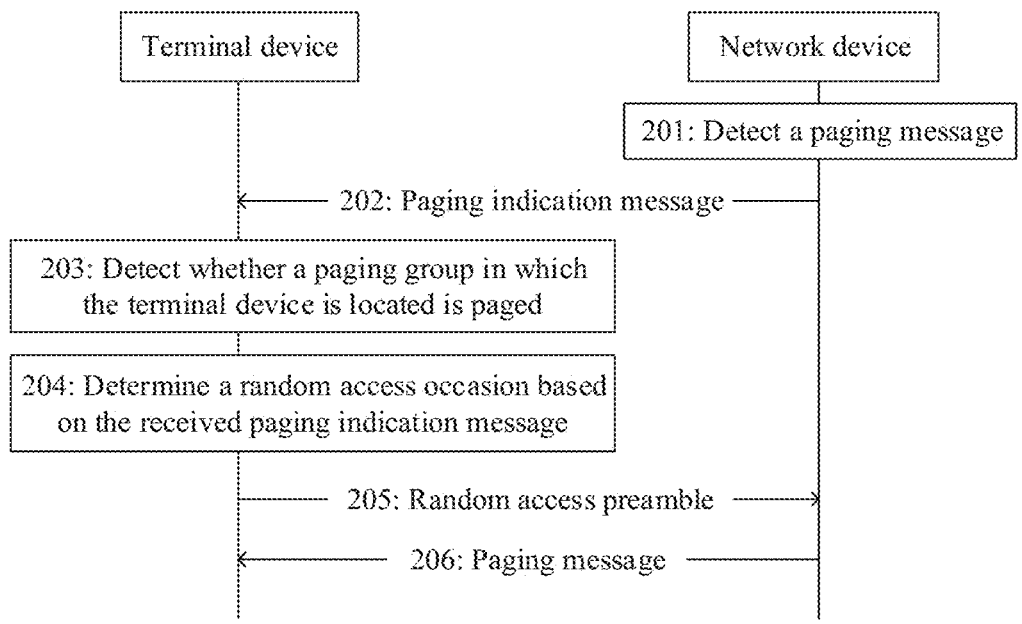
FIG. 2 is a flowchart of a paging process according to an embodiment of this application.

FIG. 2 is a schematic diagram of an application scenario according to this application.

201: A network device may detect a paging message in real time.

The network device may directly send the paging message by using a beam in one or more directions, that is, directly perform step 206. It should be understood that a pager mechanism for directly performing step 206 after performing step 201 may be referred to as a "beam sweeping paging mechanism" in the following embodiment. A beam in one direction may correspond to an SS/PBCH block.

202: When detecting arrival of the paging message, the network device sends a paging indication message to a corresponding terminal device by using a paging occasion (PO) corresponding to each terminal device.

Specifically, the paging indication message may be control resource information and/or data resource information, that is, may be transmitted in a control resource, or may be transmitted in a data resource, or may be a control resource set (CORESET), or may be downlink control information (DCI). The control resource information may be a physical downlink control channel (PDCCH). The data resource information may be a physical downlink shared channel (PDSCH). A synchronization signal block may also be referred to as a synchronization signal/PBCH (physical broadcast channel), and may include at least one of a PBCH, a PSS (primary synchronization signal), and an SSS (secondary synchronization signal).

A data bit in the paging indication message may carry information about all or some of paged UE groups, or may carry truncation identity (ID) information of some paged UEs, or may carry UE ID information of some or all of the paged UEs, or may carry information about all or some of the UE groups. The paging indication message may also be referred to as a paging index, or some information in the paging indication message may also be referred to as a paging index. A paging group may be a UE group, or may be a group based on a UE ID, or may be a group based on different synchronization signal/physical broadcast channel blocks (SS/PBCH block), or may be a group based on a paging index, or may be grouping terminal devices on a paging occasion, or may be grouping terminal devices in a tracking area, or may be grouping terminal devices in a spatial domain parameter corresponding to an SS/PBCH block, or may be a combination of some or all of the three groupings, for example, a paging group on a paging occasion in a tracking area.

Figure 3:
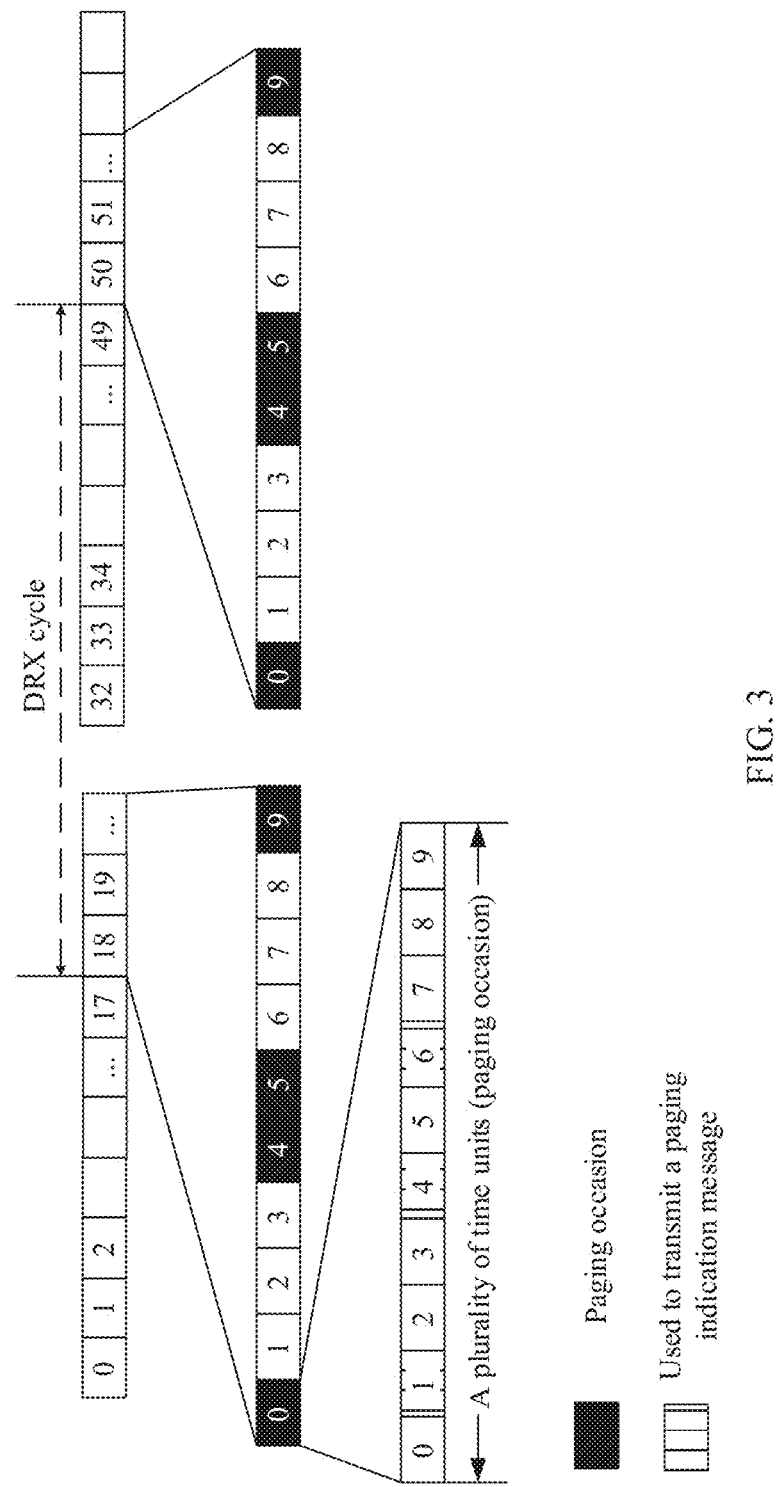
FIG. 3 is a schematic structural diagram of a paging occasion according to an embodiment of this application.

As shown in FIG. 3, a terminal device may wake up in a discontinuous reception (DRX) cycle to receive a signal. The DRX cycle may include at least one paging occasion, and at least one terminal device may receive a signal on a same paging occasion. In addition, different paging occasions are separately used to serve different terminal devices in one DRX cycle. In other words, a paging occasion on which the network device performs signal transmission with a terminal device is fixed. For example, paging occasions used to serve a terminal device in different DRX cycles in FIG. 3 are all paging occasions numbered 5. Specifically, the network device may transmit a signal by using a part of time units on each paging occasion.

A quantity of random access preambles described in this application may be a quantity of random access preambles on a random access occasion in a random access periodicity, and a random access preamble may be bound to the random access occasion. The random access preamble may also be referred to as a random access resource, and the random access occasion may also be a random access resource.

It should be understood that, in this embodiment of this application, a signal transmitted on a paging occasion may be a paging indication message, or may be a paging message or a random access preamble, or may be both a paging indication message and a paging message. This is not limited in this application.

It should be further understood that a time unit may be a frame, a subframe, a slot, or a mini-slot. This is not limited in this application.

In other words, each paging occasion may be used to page a plurality of terminal devices, and one terminal device can receive the paging message only on one paging occasion in one DRX cycle.

Optionally, before step 202, the network device may send, to the terminal device by using configuration information, a mapping relationship between information or a time-frequency resource on the paging occasion and the synchronization signal block (SS blocks)/physical broadcast channel (PBCH) block, and a mapping relationship between the SS/PBCH block and the random access occasion in the random access occasion periodicity. The information on the paging occasion may be the paging indication message, or may be control information of the paging indication message, or may be data information of the paging indication message, or may be data information of the paging message, or may be control information of the paging message. The time-frequency resource on the paging occasion may be a control information time-frequency resource of the paging indication message, or may be a data information time-frequency resource of the paging indication message, or may be a control information time-frequency resource of paging information, or may be a data information time-frequency resource of paging information.

It should be understood that the paging occasion includes at least one paging indication message or paging message, and the paging indication message or the paging message on the paging occasion may be in a one-to-one correspondence with the SS/PBCH block, or may be in a one-to-many or many-to-one association with the SS/PBCH block.

It should be understood that the random access occasion may be in a one-to-one correspondence with the SS/PBCH block, or may be in a one-to-many or many-to-one association with the SS/PBCH block.

Optionally, that there is a mapping relationship between the paging indication message or the paging message and the SS/PBCH block may be understood as that a beam used to transmit the paging indication message or the paging message on a first paging occasion is the same as a beam used to transmit an SS/a PBCH on the SS/PBCH block.

The association in this application may also be referred to as mapping, a correspondence, correlation, or allocation. When the random access periodicity or a random access set is related to the paging occasion, the random access preamble may be sent on the random access occasion in the random access periodicity by the terminal device on the paging occasion, and may be used to request the paging message or report a beam. When the random access occasion is associated with the paging message or a paging indication on the paging occasion or the SS/PBCH block, it may also indicate that there is a quasi co-located (QCL) relationship between the random access occasion and the paging message or the paging indication on the paging occasion or the SS/PBCH block, and a signal is sent or received by using same delay spread, same Doppler spread, a same average gain, a same average delay, or a same spatial domain parameter, or a signal is sent or received by using a same beam.

In this specification, when an index number of an item 1 associated with a $j^{th}$ item 2 is represented in a form of i0+i*P1 to i0+(i+1)*P1−1, where i0 may represent a start index of the item 1, when there are a plurality of association relationships, the index number of the item 1 may be related to a plurality of items, and P1 may represent a quantity of items 1, or may represent a quantity of items 1 associated with items 2, or may represent a quantity of items 2, or may represent a quantity of items 2 associated with the items 1. There is another representation manner, to be specific, i=j0+floor(j/P1), i=j0+ceil(j/P1), or i=j0+j/P1. The two representations have a same meaning, where j0 may represent a start index of an item 2, and j0 may be related to i0. When P1 is equal to 1, i=j1+j or j=i0+i. An index of an item 3 associated with an $i^{th}$ item 1 and the $j^{th}$ item 2 may be further represented as i1+i+j*P2, or may be represented as i1+floor(i/Q1)+j*P2 or i8+ceil(i/P2)+j*P3. An index of an item 4 associated with the $i^{th}$ item 1, the $j^{th}$ item 2, and a $k^{th}$ item 3 may be further represented as i2+i+j*P2+k*P3*P2, or may be represented as i2+floor(i/Q1)+j*P2+k*P3*P2 or i2+ceil(i/Q1)+j*P2+k*P3*P2, where P2 is a quantity of items 4 associated with the items 1, and P3 is a quantity of items 4 associated with the items 2. The item 1 is the paging group, Q1 represents any one of a quantity of items 1 sharing the item 4, the SS/PBCH block, the PO, the random access preamble, and a paging message window. The item 2 may be any one of the paging group, the SS/PBCH block, the PO, and the random access preamble. The item 3 may be any one of the paging group, the SS/PBCH block, the PO, and the random access preamble. The item 4 may be any one of the paging group, the SS/PBCH block, the PO, and the random access preamble.

It is defined that g(X, Y) may be represented as X/Y, or may be represented as floor(X/Y), or may be represented as ceil(X/Y).

It should be understood that the synchronization signal block in this embodiment of this application may include an SS (synchronization signal) and/or a PBCH (Physical broadcast Channel). The SS may include the PSS, or may include the SSS, or may include both the PSS and the SSS.

Optionally, the paging indication message may carry an identity (ID) of the paging group. Each paging group may include a plurality of terminal devices, and terminal devices specifically included in each paging group may be preconfigured by the terminal device and the network device, or may be agreed on, to be specific, may be agreed on in advance according to a specific rule. For example, the paging indication message corresponds to different paging groups or different paging groups by using a data bit sequence. For example, the paging indication message corresponds to different paging groups or different paging groups by using data bits.

Optionally, when the received paging indication message does not carry the ID of the paging group, the terminal device may directly perform step 204. It should be understood that, in the following embodiment, a paging mechanism for performing steps 201, 202, 205, and 206 may be referred to as a "feedback-based paging mechanism".

203: After receiving the paging indication message, the terminal device detects whether a paging group in which the terminal device is located is paged.

When the paging indication message carries the ID of the paging group, the terminal device determines, based on information about the ID of the paging group, whether the terminal device is in the group. If the terminal device is not in the group, it indicates that the terminal device is not paged. In this case, there is no need to perform a subsequent step.

204: The terminal device determines the random access occasion based on the paging indication message received on the paging occasion corresponding to the terminal device.

Specifically, the paging indication message that can be received on the paging occasion corresponds to the SS/PBCH block, and there is the mapping relationship between the SS/PBCH block and the random access occasion in the random access occasion periodicity. The terminal device determines, based on the received paging indication message, an SS/PBCH block corresponding to the paging indication message received on the first paging occasion, and then determines the random access occasion in the random access occasion periodicity (Random access channel occasion, RO) based on the SS/PBCH block.

It should be noted that the random access occasion periodicity may include at least one random access occasion. When the random access occasion periodicity includes a plurality of random access occasions, the random access occasions included in the random access time periodicity may also be referred to as a "random access occasion group" or a "random access occasion set". The first random access occasion may be at a same location in any random access occasion periodicity.

It should be understood that the random access occasion periodicity may be a random access resource association periodicity, or may be a random access resource configuration periodicity, or may be a part of a random access resource association periodicity, or may be a part of a random access resource configuration periodicity. The random access occasion periodicity resource association periodicity. The random access occasion periodicity may be understood as a time quantity or a time width occupied by the random access resource used for sending, or a quantity occupied for sending the RO.

It should be understood that the random access occasion periodicity in this embodiment of this application may be any one of 10 ms, 20 ms, 40 ms, 80 ms, and 160 ms.

205: The terminal device sends the random access preamble to the network device.

The terminal device sends the random access preamble on the first random access occasion in any one or more random access occasion periodicities after receiving the paging indication message.

Optionally, after step 203, if the terminal device is not in the paging group, the terminal device may enter a sleep state; or if the terminal device is in the paging group, the terminal device sends the random access preamble to the network device. The random access preamble may be used to indicate the paging group in which the terminal device is located.

206: The network device sends the paging message to at least one terminal device based on the random access preamble.

Specifically, the network device may determine a specific terminal device that sends each random access preamble, and then send the paging message to the terminal device that feeds back the random access preamble, and each paging message carries an ID of the terminal device.

Optionally, the paging message may further carry disaster warning messages such as a system update message, an earthquake disaster message, a volcanic disaster message, and a tsunami disaster message.

It should be understood that, in the following embodiment, a feedback mechanism for performing some or all of steps 201 to 206 is referred to as a "paging group and feedback-based paging mechanism".

In the foregoing solution, if the "feedback-based paging mechanism" and the "paging group and feedback-based paging mechanism" shown in FIG. 2 are used, because each paging group is usually associated with one random access preamble, a relatively large quantity of random access preambles are occupied, and overheads are relatively high. In addition, because a total quantity of random access preambles on one random access occasion in a cell is fixed, random access preambles used by another service are insufficient.

One beam, one SS/PBCH block (also referred to as an SS block), or one paging occasion usually corresponds to one paging indication message. A paging indication message of one beam is used as an example for description below. A case of a plurality of beams is similar.

In some embodiments, one random access preamble may be allocated to each paging group in the paging indication, or at least two paging groups may share one or more random access preambles.

For example, the paging indication carried in the paging indication message is 01110000, and each bit represents one paging group, where 1 is used to indicate that the group is paged, and 0 is used to indicate that the group is not paged (or vice versa). In the foregoing eight groups, three groups (the second, the third, and the fourth groups) are paged, and five groups are not paged. In this case, one random access preamble may be allocated to each paging indication (regardless of whether the paging group is paged), and eight random access preambles are allocated in total.

In addition, two groups may be alternatively set to share one preamble. When group information is 01110000, the first two groups 0 and 1 share one preamble 1, the third group 1 and the fourth group 1 share one preamble 2, the fifth group 0 and the sixth group 0 share one preamble 3, and the last two groups 0 and 0 share one preamble 4. Therefore, only four preambles need to be allocated in total. In addition, a shared preamble may be allocated in a group sequence, or any two groups may share one preamble without a sequence. For example, four preambles (indexes are 1, 2, 3, and 4) are allocated to the foregoing eight groups, and preamble indexes are sequentially 12341234 (or 43214321). This association manner is referred to as cyclic reuse. Alternatively, preamble indexes may be 12344321, 11223344, 22113344, or another manner may be used. Certainly, three or more groups may be alternatively set to share one preamble. For example, the first three groups 011 share one preamble, the middle two groups 100 share one preamble, and the remaining two groups 00 share one preamble.

In conclusion, one random access preamble may be allocated to each paging group (regardless of whether the paging group is paged), the at least two paging groups may be set to share one random access preamble, a quantity N of paging groups associated with one random access preamble may be configured, or K paging groups may be set to jointly associate one random access preamble. In short, when a quantity of paging groups is greater than a quantity of random access preambles, because the quantity of random access preambles is insufficient, the random access preambles need to be reused. The random access preambles may be allocated to the paging groups in a cyclic reuse manner. However, this is not limited to the foregoing manner provided that only some paging groups jointly use one or more random access preambles.

In addition, a quantity M3 of random access preambles used to be associated with paging groups may also be set, where M3 is related to at least one of the following parameters:

a quantity N1 of random access preambles used for paging, a quantity M1 of SS/PBCH blocks associated with one random access occasion, and a quantity M2 of paging occasions associated with one random access occasion. For example, M3=f(N1, M1, M2), where f(N1, M1, M2) may be any one of N1/(M1*M2), floor(N1(M1*M2)), ceil(N1/(M1*M2)), floor(floor(N1/M1)/M2), floor(floor(N1/M2)/M1), ceil(ceil(N1/M1)/M2), ceil(ceil(N1/M2)/M1), floor(ceil(N1/M1)/M2), floor(ceil(N1/M2)/M1), ceil(floor(N1/M1)/M2), ceil(floor(N1/M2)/M1), N1/M1, floor(N1/M1), ceil(N1/M1), N1/M2, floor(N1/M2), ceil(N1/M2), and N1.

The network device also configures a value of M3, a value of N1, or a value of N, or may agree with the terminal device on a value of M3, a value of N1, or a value of N in advance. The value of N1, N, or M3 may be usually any positive integer value in 1 to 64. However, a maximum value is not limited to 64, and may alternatively be 128, 265, or the like. The value of M3 may alternatively be the same as the quantity of paging groups.

A formula manner is used as an example to describe an association relationship between a random access preamble and a paging group below.

An index of a paging group associated with a random access preamble having an index i1 is i2, and in this case, i1=i0+g(i2, M3, N). For example, g(i2, M3, N) may be floor(i2/N), or may be i2, or may be ceil(i2/N), or may be i2 mod M3. Alternatively, in other words, a value of the index i2 of the paging group associated with the random access preamble i1 is i0+i1*N to i0+(i1+1)*N−1.

A value of i0 may be related to one or more of the following parameters: a quantity of SS/PBCH blocks associated with one random access occasion, a quantity of paging occasions associated with one random access occasion, an index of the SS/PBCH block associated with the random access preamble, an index of the paging occasion associated with the random access preamble, a quantity of random access preambles associated with paging groups.

In the foregoing embodiment, regardless of Whether the group is paged, the group is associated with the random access preamble. In some other embodiments, only a paged paging group may be associated with the random access preamble, there is no need to allocate the random access preamble to a paging group that is not paged, and the random access preamble needs to be allocated to only the paged paging group.

In a method, each of all paged paging groups is associated with one random access preamble.

For example, the paging indication carried in the paging indication message is 01110000, and each bit represents one paging group, where 1 is used to indicate that the group is paged, and 0 is used to indicate that the group is not paged (or vice versa). In the eight groups, three groups (the second, the third, and the fourth groups) are paged, and five groups are not paged. Therefore, there is no need to allocate the random access preamble to each group, and random access preambles need to be allocated to only the second, the third, and the fourth groups. In this case, only three random access preambles are required, thereby reducing the quantity of random access preambles. For example, indexes of the allocated random access preambles are sequentially 123, or may be 321, 132, or 231 provided that one paged paging group is associated with one random access preamble.

A quantity of paged paging groups is M4, and a quantity of random access preambles associated with the paged paging groups is N3. In the foregoing example, M4=N3, and an index of the random access preamble associated with the paged paging group having an index i1 is i2. In this case, i1=i0+i2.

A value of i0 may be related to at least one of the following parameters: a quantity of SS/PBCH blocks associated with one random access occasion, a quantity of paging occasions associated with one random access occasion, an index of the SS/PBCH block associated with the random access preamble, and an index of the paging occasion associated with the random access preamble.

In another method, at least two paged paging groups are jointly associated with one random access preamble.

For example, the paging indication is 01110000, indicating that three groups are paged in total. In this case, the second and third groups may share one preamble, and the fourth group may share one preamble. Alternatively, the second and the fourth groups may share one preamble, the third group may share one preamble. Only the two preambles are required. In this way, the quantity of random access preambles is further reduced.

Alternatively, a quantity M5 of random access preambles associated with the paged paging group may be preset. If M5 is greater than or equal to a quantity of paged paging groups, one random access preamble may be allocated to each paged paging group. In the foregoing example, M5=3. Because the three groups (the second, the third, and the fourth groups) are paged in total in the eight paging groups, one random access preamble may be allocated to each group.

If M5 is less than a quantity of paged paging groups, for example, the paging indication is 01111000, indicating that four groups (the second, the third, the fourth, and the fifth groups) are paged, and only three random access preambles (indexes are 1, 2, and 3) are associated with the paged paging groups, at least two groups may share one random access preamble. For example, the second and the fifth groups share a random access preamble 1, and random access preambles associated with the third and the fourth groups are 2 and 3 respectively. In other words, indexes of random access preambles associated with the four paged paging groups are sequentially 1231. That is, after all preambles are allocated, the preambles are allocated from the beginning again. This manner may be referred to as cyclic reuse.

In the foregoing example, when M5 is less than the quantity of paged paging groups, because the quantity of random access preambles is insufficient, the random access preambles are allocated to the paged paging groups in a cyclic reuse manner. However, this is not limited to the foregoing manner provided that only some paging groups jointly use one or more random access preambles. For example, the second and the third groups share the random access preamble 1, and the fourth and the fifth groups respectively use the random access preambles 2 and 3. Other association manners may also be used. For example, indexes of random access preambles associated with the foregoing four paged paging groups may alternatively be various allocation manners such as 1123, 3212, 1233, or 1233.

For example, if six groups are paged, and M5=3, that is, there are only three random access preambles (indexes are 1, 2, and 3), preambles may be associated with the six groups in various manners such as 123123, 112233, 123321, 113322, and 111223. In short, the quantity of preambles is insufficient, and the preambles need to be repeatedly used by a plurality of paged groups.

The paging indication message may be sent by using different beams, but carried content is usually the same. For example, paging indication messages carried by four beams are all 01010000. In other words, two groups (the second and the fourth groups) are paged in total, the paging indication messages are sent by using the four beams, and one random access preamble may be allocated to each of paged groups of each beam. For example, preambles 1 and 2 are allocated to two groups of a beam 1, preambles 3 and 4 are allocated to two groups of a beam 2, preambles 5 and 6 are allocated to two groups of a beam 3, and preambles 7 and 8 are allocated to two groups of a beam 4. In other words, random access preambles allocated to paged groups 24242424 are 12345678. If M5 is less than 8, the quantity of random access preambles is insufficient in this case. For example, M5=3, only three preambles are available for allocation, and indexes are respectively 1, 2, and 3. In this case, indexes of random access preambles may be allocated to the paged paging group 24242424 in a plurality of manners such as 12312312,11223311,12332112,11332233, or may be allocated in another manner. In short, a plurality of paged paging groups need to share one or more random access preambles. A beam of each paging indication message may correspond to one SS/PBCH block, or may correspond to a plurality of SS/PBCH blocks. The beam may also be referred to as a spatial domain parameter.

It can be learned from the foregoing that when the random access preambles are insufficient for allocation, a preamble may be allocated to a surplus paging group in the cyclic reuse manner, or may be allocated in a manner in which every at least two groups share one preamble, or may be allocated in an out-of-order manner, or may be allocated in a random manner, or in another manner.

A value range of M5 may be changed, and may be all or some values in 1 to 64, for example, 2, 4, 6, and 8. A value of M5 may be alternatively fixed. To be specific, the value is agreed on by the network device and the terminal device, and may be any value in 1 to 64. However, a maximum value is not limited to 64, and may alternatively be 128, 256, or the like.

In addition, the value of M5 may be obtained through calculation and is usually related to at least one of the following parameters: a quantity N1 of random access preambles used for paging, a quantity M1 of SS/PBCH blocks associated with one random access occasion, and a quantity M2 of paging occasions associated with one random access occasion.

For example, M5=f(N1, M1, M2), where f(N1, M1, M2) may be any one of N1/(M1*M2), floor(N1/(M1*M2)), ceil (N1/(M1*M2)), floor(floor(N1/M1)/M2), floor(floor(N1/M2)/M1), ceil(ceil(N1/M1)/M2), ceil(ceil(N1/M2)/M1), floor(ceil(N1/M1)/M2), floor(ceil(N1/M2)/M1), ceil(floor (N1/M1)/M2), ceil(floor(N1/M2)/M1), N1/M1, floor(N1/M1), ceil(N1/M1), N1/M2, floor(N1/M2), ceil(N1/M2), and N1.

The foregoing provides several calculation manners. It should be understood that the calculation manners are merely examples. This is not limited to the foregoing calculation manners.

In addition, the value of M5 may be related to a DRX cycle of the terminal device or the network device. A DRX cycle of each terminal device or each network device may have one value of M5, or DRX cycles of a plurality of terminal devices or network devices have one value of M5. For example, DRX cycles of two or four terminal devices or network devices have one value of M5. The value of M5 in each DRX cycle may also be calculated according to the foregoing method.

The network device may configure the value of M5, a value of N1, or a value of N, or may agree with the terminal device on the value of M5, a value of N1, or a value of N in advance. The value of N1, N, or M5 may be usually any positive integer value in 1 to 64. However, a maximum value is not limited to 64, and may alternatively be 128, 265, or the like. The value of M5 may alternatively be the same as the quantity of paging groups.

When the quantity of paged paging groups is greater than M5, an index of a paged paging group associated with the random access preamble having an index it is i2, in this case, i1=i0+g(i2, M6, M5), and g(i2, M6, M5) may be floor(i2/M6), or may be i2, or may be ceil(i2/M6), or may be i2 mod M5. M6 may represent a quantity of paged paging groups associated with one random access preamble. The index of the paged paging group is a paging group index obtained after indexes of paged paging groups in paging groups are sorted. For example, the paging indication is 01001000, only a paging group 1 and a paging group 4 in paging groups are paged, that is, only two paging groups are paged, and the two paging groups are arranged in sequence. The paging group 1 corresponds to an index 0 of the paged group, and the paging group 4 corresponds to an index 1 of the paged group, where i2 represents a paging group index obtained after the paged paging groups in the paging groups are rearranged in sequence. The sequence may be an ascending order of index numbers, or may be a descending order of index numbers, or may be a random order of index numbers.

A value of i0 may be related to at least one of the following parameters: a quantity of SS/PBCH blocks associated with one random access occasion, a quantity of paging occasions associated with one random access occasion, an index of the SS/PBCH block associated with the random access preamble, an index of the paging occasion associated with the random access preamble, a quantity of random access preambles associated with paged paging groups.

The network device also configures a value of M6 or configures the value of M5, or may agree with the terminal device on a value of M6 or the value of M5 in advance. The value of M5 may be any positive integer value in 1 to 64. The value of M6 may also be any positive integer value in 1 to 64. The value of M5 may be related to M6, and a related manner is M6=ceil(N3/M5), M6=floor(N3/M5), or M6=N3/M5. When the network device configures the value of M5, the configured value is some or all of values in 1 to 64, for example, may be 2, 4, 8, and 16.

In this application, Mod or mod represents modulo, ceil represents rounding up, and floor represents rounding down. In a formula, "/" indicates that a division operation is performed on two numbers.

The following lists one association manner.

For example, j0 represents a start index of a random access preamble that may be used for paging, and may be a constant. The constant may be 0, or may be another number, and may be deduced by using a network configuration or a parameter of a network configuration. A parameter 1 and a parameter 2 may respectively represent a quantity of SS/PBCH blocks associated with one random access occasion or resource and a quantity of paging occasions associated with one random access occasion or resource, and may be represented in any sequence. M7 may represent a quantity of parameters 1, M8 may represent a quantity of parameters 2, and i0 may be j0+i1*M5 or j0+i1*M5+i2*M5*M7. For example, the index j0 of the random access preamble used for the paging starts from 4, the parameter 1 is that the quantity of paging occasions is 2, the parameter 2 is that the quantity of SS/PBCH blocks is 3, and the quantity of random access preambles associated with the paging groups is 2. In this case, 12 random access preambles are required in total. Indexes of the 12 random access preambles are 4, 5, 6, 7, 8, 9, 10, 11, 12, 13, 14, and 15. In this case, i0 of a paging group in a first SS/PBCH block on a first paging occasion is represented as 4, i0 of a paging group in a second SS/PBCH block on the first paging occasion is represented as 6, i0 of a paging group in a third SS/PBCH block on the first paging occasion is represented as 8, i0 of a paging group in a first SS/PBCH block on a second paging occasion is represented as 10, and so on.

In the foregoing embodiments, values of M3, M5, M6, N1, and N may be agreed on by the network device and the terminal device in advance, or may be defined in a standard, or may be configured by the network device and sent to the terminal device. Configuration information may be carried on any one or more of a physical broadcast channel (PBCH), RMSI, a system information block (SIB) 1, a SIB 2, a SIB 3, a media access control-control element (MAC-CE), downlink control information (DCI), and radio resource control (RRC) signaling and system information.

Similarly, different paged paging groups may be associated by using different random access occasions, or different paged groups may be associated by using both different random access occasions and different random access preambles. When the different paged groups are associated by using the random access occasions, the foregoing random access preambles may be replaced with the random access occasions. When the different paged groups are associated by using both the different random access occasions and the different random access preambles, the random access occasions and the random access preambles may be collectively referred to as random access resources, and a quantity of the random access resources may be a product of the random access occasions and the random access preambles. Alternatively, the foregoing random access preambles may be replaced with random access resources.

In the foregoing embodiments, the association relationship between the paging group and the random access preamble, or the association relationship between the paged paging group and the random access preamble may be specified in the standard, and the network device or the terminal device has learned of the association relationship in advance. Alternatively, the association relationship may be separately configured by the network device or the terminal device, or may be configured by the network device and then sent to the terminal device, and configuration information is carried in various messages mentioned in the foregoing paragraphs.

An embodiment of this application further discloses a signal transmission method, including: sending, by a network device, a paging indication to a terminal device, where the paging indication carries information about a plurality of paging groups; determining, by the terminal device based on an association relationship, a random access preamble associated with a paging group in which the terminal device is located; and sending the random access preamble to the network device. The association relationship is an association relationship between a paged paging group in the plurality of paging groups and a random access preamble, or an association relationship between the plurality of paging groups and a random access preamble. The association relationship is described in detail in the foregoing embodiments, and details are not described again.

Figure 4:
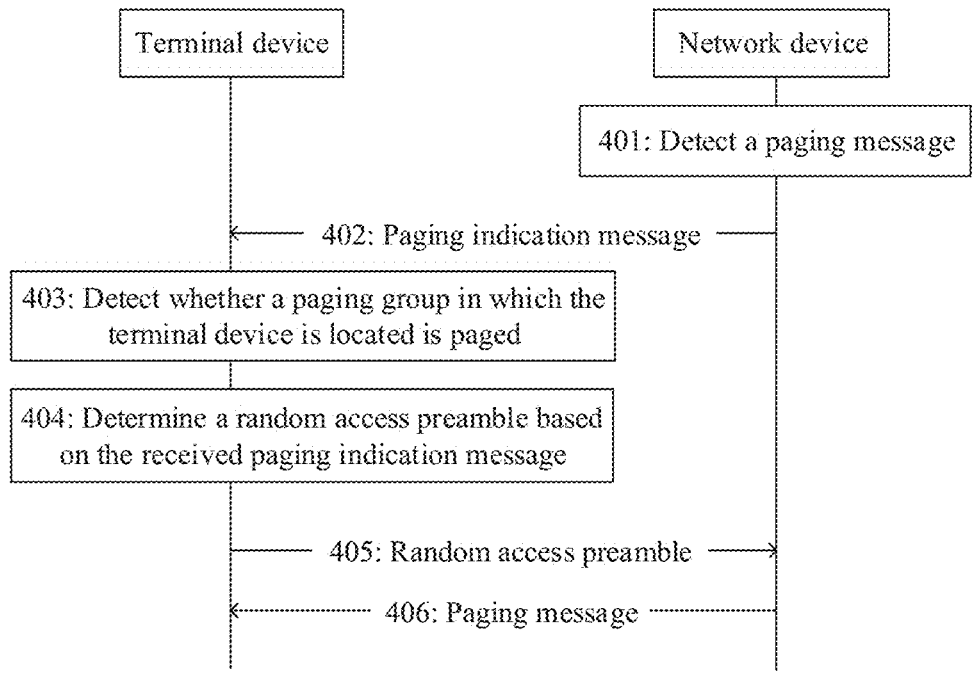
FIG. 4 is a flowchart of a paging process according to another embodiment of this application.

The following describes a paging completion process with reference to FIG. 4 and the association manner between the paging group and the random access preamble mentioned above. A terminal device and a network device are used as an example for description below.

401 and 402: The network device sends a paging indication to the terminal device, where the paging indication carries information about a plurality of paging groups.

The steps are similar to steps 201 and 202. For example, the information about the plurality of groups is 01110000, where 1 is used to indicate that a group is paged, and 0 is used to indicate that a group is not paged.

The network device may send the paging indication by using a plurality of beams, so that terminal devices at different locations receive the paging indication.

403: After receiving the paging indication, the terminal device detects whether a paging group in which the terminal device is located is paged.

This step is similar to step 203. If the terminal device is in the foregoing paged paging group, for example, in a second group, the following steps continue to be performed; or the terminal device is not in the foregoing paged paging group, no related operation is performed. For example, if the terminal device is in a first group, it indicates that the first group is not paged.

404: The terminal device sends a random access preamble based on an association relationship.

The association relationship may be an association relationship between a paged paging group in the plurality of paging groups and a random access preamble, or may be an association relationship between the plurality of paging groups and a random access preamble mentioned in the foregoing embodiments. The association relationship has been described in detail by using an example, and is not further described herein.

In addition, the terminal device further determines a random access resource such as a random access occasion based on the paging indication. This part of content is similar to 204, and details are not described again.

405: The terminal device sends the random access preamble to the network device.

406: The network device sends a paging message to the terminal device after receiving the random access preamble.

405 and 406 are similar to 205 and 206, and details are not described again.

The foregoing solution is merely a simplified paging procedure, and focuses on how to determine, based on the association relationship, the random access preamble associated with the paging group of the terminal device. For other procedures and details, refer to the embodiment in FIG. 2. Details are not described herein again.

The association relationship in the foregoing embodiments may be defined in a standard, or may be agreed on by the network device and the terminal device in advance, or may be configured by the network device and sent to the terminal device. Configuration information may be carried on any one of a physical broadcast channel (PBCH), RMSI, a system information block (SIB) 1, a SIB 2, a SIB 3, a media access control-control element (MAC-CE), downlink control information (DCI), and radio resource control (RRC) and system information.

In addition, one or more of values of M3, M5, M6, N, and N1 mentioned in the foregoing embodiments may also be agreed on by the network device and the terminal device in advance, or may be configured by the network device and sent to the terminal device. Configuration information may also be carried in the foregoing message.

It should be understood that specific examples in the embodiments of this application are merely intended to help a person skilled in the art better understand the embodiments of this application, rather than limiting the scope of the embodiments of this application.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

In this application, "at least one" refers to one or more, and "a plurality of" refers to two or more. The term "and/or" describes an association relationship between associated objects and may indicate three relationships. For example, A and/or B may indicate the following cases: Only A exists, both A and B exist, and only B exists, where A and B may be singular or plural. The character "/" generally indicates an "or" relationship between the associated objects. "At least one (one piece) of the following" or a similar expression thereof refers to any combination of these items, including any combination of singular items (pieces) or plural items (pieces). For example, at least one (one piece) of a, b, or c may indicate: a, b, c, a-b, a-c, b-c, or a-b-c, where a, b, and c may be singular or plural. Greater than or equal to means greater than or equal to, and less than or equal to means less than or equal to.

The foregoing describes in detail the signal transmission method according to the embodiments of this application. The following describes a signal transmission apparatus according to embodiments of this application.

Figure 5:
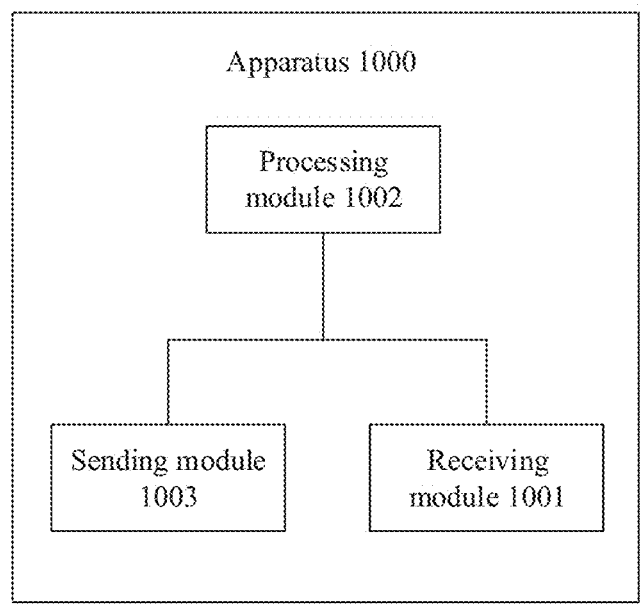
FIG. 5 is a schematic block diagram of a signal transmission apparatus according to an embodiment of this application.

FIG. 5 is a schematic block diagram of a signal transmission apparatus 1000 according to an embodiment of this application.

The signal transmission apparatus 1000 is provided, and the apparatus may be a terminal device, or may be a chip or a function module in a terminal device, and includes:
- a receiving module 1001, configured to receive a paging indication sent by a network device, where the paging indication carries information about a plurality of paging groups; and
- a sending module 1003, configured to: send, to the network device based on an association relationship between a paged paging group in the plurality of paging groups and a random access preamble, a random access preamble associated with a paging group in which the terminal device is located; or
- send, to the network device based on an association relationship between the plurality of paging groups and a random access preamble, a random access preamble associated with a paging group in which the terminal device is located.

The apparatus may further include a processing module 1002, configured to: determine, based on the association relationship between the paged paging group in the plurality of paging groups and the random access preamble, the random access preamble associated with the paging group in which the terminal device is located; or determine, based on the association relationship between the plurality of paging groups and the random access preamble, the random access preamble associated with the paging group in which the terminal device is located.

The receiving module and the sending module may be combined into a transceiver module.

The apparatus may include only the sending module and the receiving module, or may include the receiving module, the processing module, and the sending module. In this case, the sending module is configured to send only the random access preamble associated with the paging group in which the terminal device is located.

It should be understood that the signal transmission apparatus 1000 may correspond to the terminal device in the foregoing corresponding method embodiment, and may have any function of the terminal device in the method. For details, refer to the method embodiment. Details are not described again.

Figure 6:
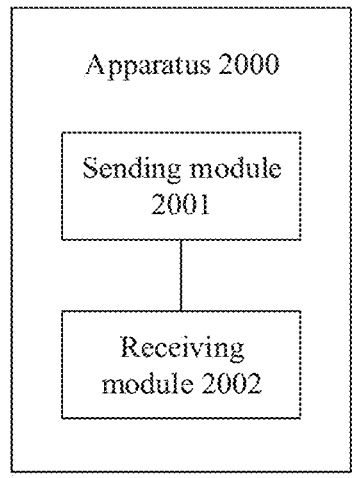
FIG. 6 is a schematic block diagram of a signal transmission apparatus according to an embodiment of this application.

Correspondingly, similarly, referring to FIG. 6, a signal transmission apparatus 2000 is further disclosed, and the apparatus is a network device, or a chip or a function module in a network device, and includes:
- a sending module 2001, configured to send a paging indication to a terminal device, where the paging indication carries information about a plurality of paging groups; and
- a receiving module 2002, configured to receive a random access preamble associated with a paging group in which the terminal device is located, where the random access preamble associated with the paging group in which the terminal device is located is determined based on an association relationship between a paged paging group in the plurality of paging groups and a random access preamble, or the random access preamble associated with the paging group in which the terminal device is located is determined based on an association relationship between the plurality of paging groups and a random access preamble.

The sending module 2001 is further configured to send a paging message to the terminal device based on the random access preamble associated with the paging group in which the terminal device is located.

The sending module 2001 is further configured to: configure the association relationship, and send the association relationship to the terminal device.

The signal transmission apparatus 2000 may further include a processing module (not shown in the figure), configured to perform a function corresponding to a step other than steps of sending and receiving in the method embodiment.

Optionally, if the foregoing signal transmission apparatus 2000 is a chip in a terminal device or a network device, the chip includes a processing module and a transceiver module. The transceiver module may be implemented by a transceiver, and the processing module may be implemented by a processor. The transceiver module may be, for example, an input/output interface, a pin, or a circuit. The processing module may execute a computer-executable instruction stored in a storage unit. The storage unit is a storage unit in the chip, such as a register or a buffer, or the storage unit may be a storage unit in the terminal but outside the chip, such as a read-only memory (ROM), another type of static storage device capable of storing static information and instructions, or a random access memory (RAM).

There is also another implementation for the foregoing apparatus embodiments. Referring to an apparatus 3000 in FIG. 7, the processing module in the foregoing embodiments may be replaced with a processor 3002, the sending module may be replaced with a transmitter 3003, and the receiving module may be replaced with a receiver 3001, which respectively perform a sending operation, a receiving operation, and a related processing operation in each method embodiment. The transmitter and the receiver may form a transceiver. There may be one or more processors.

The processor 3002 may be a general purpose processor, a digital signal processor, an application-specific integrated circuit, a field programmable gate array, or another programmable logic device. There may be the one or more processors.

The transmitter 3003 and the receiver may form the transceiver. An antenna may be further included, and there may be one or more antennas.

In addition, a storage unit (not shown in the figure) may be further included, and is configured to store related information. A memory may be an independent device, or may be integrated into the processor. The storage unit may be the memory (not shown in the figure), and is configured to store computer-executable program code. When the program code includes an instruction, and when the processor executes the instruction, the instruction enables the network device or the terminal device to perform a corresponding step in the method embodiments.

The foregoing components may be coupled together by using a bus. In addition to a data bus, the bus further includes a power bus, a control bus, and a status signal bus. However, for clear description, various types of buses in the figure are marked as the bus.

Figure 7:
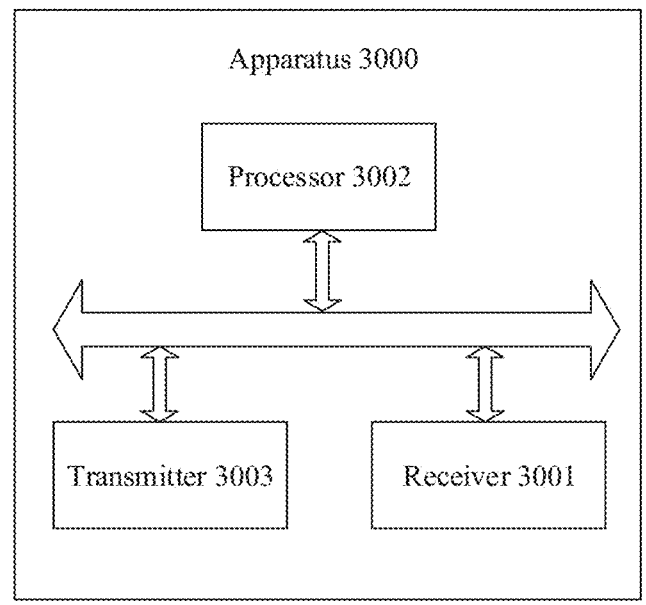
FIG. 7 is a schematic structural diagram of a signal transmission apparatus according to another embodiment of this application.

FIG. 7 is merely a schematic diagram, and another element or only some elements may be further included, for example, the transmitter and the receiver are included, or only the transmitter, the receiver, and the processor are included.

Each of the foregoing components or some components in FIG. 7 may be integrated into a chip for implementation, for example, integrated into a baseband chip for implementation.

Optionally, the storage unit is a storage unit in the chip, such as a register or a buffer, or the storage unit may be a storage unit in the terminal but outside the chip, such as a read-only memory (ROM), another type of static storage device capable of storing static information and instructions, or a random access memory (RAM).

It should be understood that, the processor may be an integrated circuit chip, and has a signal processing capability. In an implementation process, steps in the foregoing method embodiments may be implemented by using a hardware integrated logical circuit in the processor or an instruction in a form of software. The foregoing processor may be a general purpose processor, a digital signal processor (DSP), an application-specific integrated circuit (ASIC), a field programmable gate array (FPGA) or another programmable logic device, a discrete gate or transistor logic device, or a discrete hardware component. The processor may implement or perform the methods, the steps, and logical block diagrams that are disclosed in the embodiments of this application. The general purpose processor may be a microprocessor, or the processor may be any conventional processor or the like. Steps of the methods disclosed with reference to the embodiments of this application may be directly executed and accomplished by using a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

It may be understood that the memory in the embodiments of this application may be a volatile memory or a nonvolatile memory, or may include a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchronous link DRAM, SLDRAM), and a direct rambus random access memory (direct rambus RAM, DR RAM). It should be noted that the memory of the systems and methods described in this specification includes but is not limited to these memories and memories of any other proper types.

In a possible design, the chip system further includes a memory. The memory is configured to store program instructions and data that are necessary to a distributed unit, a centralized unit, the terminal device, and the network device. The chip system may include a chip, or may include a chip and another discrete component.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing systems, apparatuses, and units, refer to a corresponding process in the foregoing method embodiments. Details are not described herein again.

In the several embodiments provided in this application, it should be understood that the disclosed systems, apparatuses, and methods may be implemented in other manners. For example, the described apparatus embodiment is merely an example. For example, the unit division is merely logical function division and may be another division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, that is, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit.

When the functions are implemented in the form of a software function unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes: various mediums that can store program code, such as a USB flash drive, a removable hard disk, a read-only memory (ROM), a random access memory (RAM), a magnetic disk, and an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A signal transmission method, comprising:
receiving, by a terminal device, a paging indication sent by a network device, wherein the paging indication carries information about a plurality of paging groups;
determining, by the terminal device, a synchronization signal/physical broadcast channel block (SS/PBCH block) corresponding to the paging indication based on configuration information sent by the network device;
determining, by the terminal device, a random access occasion corresponding to the SS/PBCH block based on the configuration information; and
sending, on the determined random access occasion, by the terminal device to the network device based on an association relationship between a paged paging group in the plurality of paging groups and a random access preamble, a random access preamble associated with a paging group in which the terminal device is located.

2. The method according to claim 1, wherein
each paged paging group is associated with one random access preamble, or at least two paged paging groups share one random access preamble.

3. The method according to claim 1, wherein a quantity of random access preambles associated with paged paging groups is related to one or more of the following parameters: a quantity of random access preambles used for paging, a quantity of synchronization signal/physical broadcast channel blocks (SS/PBCH blocks) associated with one random access occasion, or a quantity of paging occasions associated with one random access occasion.

4. The method according to claim 1, wherein the paged paging group is associated with the random access preamble in a one-to-one manner, or the paged paging group is associated with the random access preamble in a cyclic reuse manner.

5. A signal transmission method, comprising:
receiving, by a terminal device, a paging indication sent by a network device, wherein the paging indication carries information about a plurality of paging groups;
determining, by the terminal device, a synchronization signal/physical broadcast channel block (SS/PBCH block) corresponding to the paging indication based on configuration information sent by the network device;
determining, by the terminal device, a random access occasion corresponding to the SS/PBCH block based on the configuration information; and
sending, on the determined random access occasion, by the terminal device to the network device based on an association relationship between the plurality of paging groups and a random access preamble, a random access preamble associated with a paging group in which the terminal device is located.

6. The method according to claim 5, wherein
each paging group is associated with one random access preamble, or at least two paging groups share one random access preamble.

7. The method according to claim 5, wherein a quantity of random access preambles associated with paging groups is related to one or more of the following parameters: a quantity of random access preambles used for paging, a quantity of synchronization signals/physical broadcast channel blocks (SS/PBCH blocks) associated with one random access occasion, or a quantity of paging occasions associated with one random access occasion.

8. The method according to claim 5, wherein the paging group is associated with the random access preamble in a one-to-one manner, or the paging group is associated with the random access preamble in a cyclic reuse manner.

9. A signal transmission method, comprising:
sending, by a network device, a paging indication to a terminal device, wherein the paging indication carries information about a plurality of paging groups;
receiving, on a random access occasion, by the network device, a random access preamble associated with a paging group in which the terminal device is located, wherein the random access preamble associated with the paging group in which the terminal device is located is determined based on an association relationship between a paged paging group in the plurality of paging groups and a random access preamble, or the random access preamble associated with the paging group in which the terminal device is located is determined based on an association relationship between the plurality of paging groups and a random access preamble, and wherein the random access occasion corresponds to a synchronization signal/physical broadcast channel block (SS/PBCH block) that corresponds to the paging indication according to configuration information sent by the network device; and
sending, by the network device, a paging message to the terminal device based on the random access preamble associated with the paging group in which the terminal device is located.

* * * * *